G. JESSUP.
Improvement in Cultivators.
No. 132,764.  Patented Nov. 5, 1872.
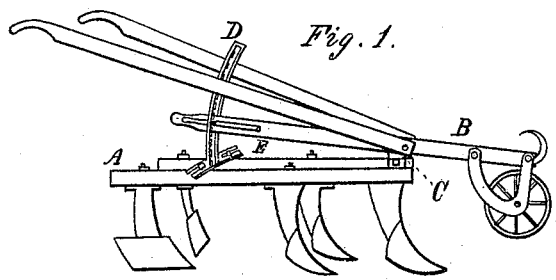
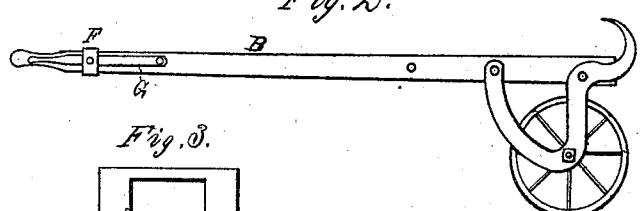
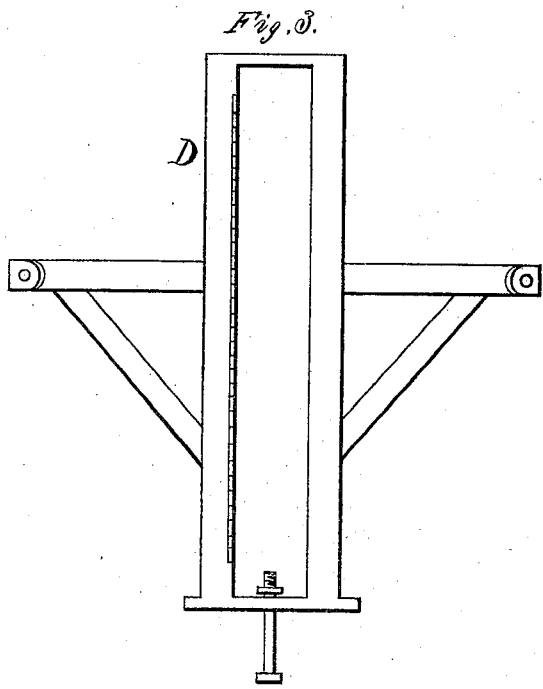
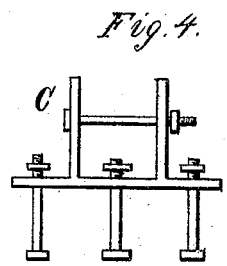
Witnesses.
John L. Lewis
Charles Ketchum
Inventor.
Gilbert Jessup

UNITED STATES PATENT OFFICE.

GILBERT JESSUP, OF SHORTSVILLE, NEW YORK.

IMPROVEMENT IN CULTIVATORS.

Specification forming part of Letters Patent No. 132,764, dated November 5, 1872.

*To all whom it may concern:*

Be it known that I, GILBERT JESSUP, of Shortsville, in the county of Ontario and State of New York, have invented certain Improvements in Cultivators, of which the following is a specification:

The first part of my invention relates to the application of a beam to any ordinary cultivator in such a manner that the operator may regulate the depth for the cultivator with ease when in operation by raising or lowering the hind end of the beam, and attaching to the beam a supporting-wheel and draft-hook. The second part relates to the method of attaching the beam to the cultivator, and the means employed to adjust and hold the hind end of the beam.

Figure 1 is a side elevation of the cultivator. Fig. 2 is the beam and its attachments. Fig. 3 is a front view of the support for the beam and handles. Fig. 4 is a coupling; it couples the timber of the cultivator together and the beam to the forward end of the cultivator.

A is the frame of the cultivator. It may be made any required size or shape, and in any ordinary manner, and may have any kind of standards and teeth preferred, and any number, according to the cultivating required to be done. The frame is usually made of three pieces of timber of convenient size and length. The forward ends are held together by the coupling C, so that the hind end may be spread apart any width required. On the top of the frame, and near the hind end, is placed a timber, E, to hold the side pieces of the frame in any required position. This timber E is fastened to the middle piece, and has a slot or series of holes for bolts that hold the side pieces in proper position. B is the beam. It is shaped as shown in Fig. 2. The hind end is made a convenient handle by turning or otherwise. The forward end is chamfered to receive the wheel-standard. The size of the beam may be varied to correspond with the size and weight of the cultivator, or the work it is intended to do. It is held to the forward part of the frame by the coupling C, by a pin or bolt that will allow it to turn on the bolt freely. The hind end extends through the standard D a convenient distance to be easily worked. It is provided with a spring-pintle that will allow it to be readily adjusted, and will hold it in any required position. It is adjusted and held by a series of holes or notches on one side of its passage through the standard D. By raising the hind end of the lever the cultivator will work less depth, and by lowering it deepen the cut of the cultivator. The wheel-standard is fastened to the forward end, as shown in Figs. 1 and 2. C is a coupling that holds the forward end of the frame together, and holds the beam B to the cultivator. Its shape is represented in Fig. 4, and its position in Fig. 1. The forward end of the handles are bolted to it. D is the standard that supports the rear end of the handles, and the hind end of the beam B extends through the middle of it where space is made to allow the beam to be raised or lowered with ease as much as is necessary to cause the cultivator to work the required depth. At one side of the space for the beam is a series of holes or notches for the pintle on the handle or lever G to enter, for the purpose of holding the hind end of the beam B at any required height. Its shape is represented in Fig. 3, and its position in Fig. 1. It is provided with arms and braces to support the hind end of the handles, by bolting them to the end of the arms. It is placed on the top of the cross-timber E, and is held there by a bolt that is put through it, the timber E, and the middle piece of the frame that holds them all firmly together. E is a piece of timber to lie across the top of the frame A. Its use is to hold the timbers of the frame in any required position. It is bolted to the middle piece of the frame. It has a series of holes or a slot in each end made in a circular form for bolts that pass through the holes or slots and outside pieces of the frame to hold them in any required position. F is a clasp that is put on the beam where it comes in contact with the standard D. Its use is to prevent the beam being worn by being moved up and down in the standard; also to hold the lever G and support it in the proper position. It is made of a piece of iron bent in a semicircular form, large enough to receive the whole of the beam, and have sufficient space in the circular part for the lever G to be operated in. It has a hole for the pintle of the lever G at the vertex of the circle, and is held to the beam by a rivet or bolt being put through its two ends and the beam. G is a lever made of iron and fastened to the side of the beam B, as shown in Fig. 2. It is provided with a spring between it and the beam, to hold it as far from the beam as the clasp F will allow. It extends backward through the clasp to near the end of the beam so that both it and the beam may be held by one hand of the operator. It is provided with a strong pintle projecting from its outward side through the hole in the clasp F far enough to enter into the holes or notches in the standard D for the purpose of holding the end of the beam at any required height.

To change the position of the beam, take hold of the hind end and with it the end of the lever; press the lever to the beam, thus causing the pintle to recede from the holes or notches in the standard; then raise or lower the beam, as desired, and let loose the beam; and it will remain in proper position. All these operations may be performed with ease while the cultivator is in operation.

I claim—

The pivoted bar B provided with a bearing-wheel at its forward end, in combination with the cultivator-frame and segment D, as and for the purpose specified.

GILBERT JESSUP.

Witnesses:
JOHN L. LEWIS,
CHARLES KETCHUM.